(12) United States Patent
Miranda et al.

(10) Patent No.: US 10,074,231 B2
(45) Date of Patent: Sep. 11, 2018

(54) METHOD FOR THE ACTIVATION OF A PAYMENT CARD, CORRESPONDING SYSTEM AND COMPUTER PROGRAM

(71) Applicant: STMICROELECTRONICS S.R.L., Agrate Brianza (IT)

(72) Inventors: Rita Miranda, San Giuseppe Vesuviano (IT); Carlo Cimino, Naples (IT); Marco Alfarano, Naples (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 0 days.

(21) Appl. No.: 14/971,232

(22) Filed: Dec. 16, 2015

(65) Prior Publication Data
US 2016/0364938 A1 Dec. 15, 2016

(30) Foreign Application Priority Data

Jun. 9, 2015 (IT) .......................... 102015000021677

(51) Int. Cl.
*G06K 7/00* (2006.01)
*G07F 7/08* (2006.01)
(Continued)

(52) U.S. Cl.
CPC .......... *G07F 7/08* (2013.01); *G06F 17/30876* (2013.01); *G06K 19/07345* (2013.01);
(Continued)

(58) Field of Classification Search
USPC .................. 235/375, 379, 380; 705/5, 35–45
See application file for complete search history.

(56) References Cited

U.S. PATENT DOCUMENTS

2004/0128395 A1* 7/2004 Miyazaki ................ G06F 21/10
   709/229
2012/0010992 A1* 1/2012 Gillin ..................... G06Q 10/10
   705/14.49

(Continued)

FOREIGN PATENT DOCUMENTS

WO WO2010070539 A1 6/2010

OTHER PUBLICATIONS

Davis et al.—Two Factor Auth List, https://web.archive.org/web/20150607001758/https://twofactorauth.org, Jun. 7, 2015, 16 pages.

*Primary Examiner* — Matthew Mikels
(74) *Attorney, Agent, or Firm* — Slater Matsil, LLP

(57) ABSTRACT

A method for activation of a payment card includes accessing a remote computer server of a card issuer to input card activation information, storing a unique code in the payment card having a contactless readable interface and in the remote computer server, the unique code corresponding to the payment card, and reading the unique code by a user terminal having a corresponding contactless interface, the user interface configured to connect over a communication network to access messages directed to the cardholder. The method also includes sending the unique code from the user terminal to the remote computer server, and upon verification of the unique code at the remote computer server, generating and sending an activation code to the user terminal and supplying access to an activation code input mask corresponding to the payment card. In addition, the method includes that upon submission of the activation code through the activation code input mask, comparing the submitted activation code with the generated activation code and, when matching, activating the payment card.

31 Claims, 4 Drawing Sheets

(51) Int. Cl.
*G06Q 20/32* (2012.01)
*G06Q 20/34* (2012.01)
*G06Q 20/42* (2012.01)
*G06F 17/30* (2006.01)
*G06K 19/073* (2006.01)

(52) U.S. Cl.
CPC ....... *G06Q 20/3278* (2013.01); *G06Q 20/352* (2013.01); *G06Q 20/354* (2013.01); *G06Q 20/425* (2013.01)

(56) References Cited

U.S. PATENT DOCUMENTS

| | | | |
|---|---|---|---|
| 2012/0025950 A1* | 2/2012 | Von Tippelskirch | G06F 21/42 340/5.74 |
| 2012/0166314 A1* | 6/2012 | Kimberg | G06Q 30/0601 705/27.1 |
| 2013/0166441 A1 | 6/2013 | Kobylkin et al. | |
| 2013/0166464 A1* | 6/2013 | Schneider | G06Q 30/06 705/318 |
| 2014/0027506 A1 | 1/2014 | Heo et al. | |
| 2014/0081860 A1* | 3/2014 | Adrangi | G06Q 20/353 705/44 |
| 2014/0330726 A1* | 11/2014 | Ball | G06F 21/34 705/67 |

\* cited by examiner

| Field | | Label |
|---|---|---|
| CARD NO. | [_____] | SC |
| CUSTOMER PHONE | [_____] | PH |
| CUSTOMER EMAIL | [_____] | EM |
| UNIQUE NUMBER | [_____] | UN |
| ACTIVATION CODE | [_____] | US |
| TO BE FIRST ACTIVATED | Y/N (AH) | |
| ACTIVATED | Y/N (AF) | |

METHOD FOR THE ACTIVATION OF A PAYMENT CARD, CORRESPONDING SYSTEM AND COMPUTER PROGRAM

TECHNICAL FIELD

The present description relates to a system for the activation of a payment card, and, more particularly, to accessing a remote computer server of a card issuer to input card activation information. Various embodiments may apply e.g., in activation of credit cards, implemented on dual interface smart cards.

BACKGROUND

Payment cards, such as credit cards, after issuance and shipment to the customer, need to undergo an activation process before being used for purchases. The issuance of a payment card requires the customer to first request a payment card from his bank. Then, since it takes time for the payment card to be prepared, the bank cannot provide the user, or cardholder, with the payment card at the time of the request. Accordingly, the bank typically ships the payment card to the customer by mail at a later date. As a consequence, the payment card is set to a "not active state" before shipping, because it could be stolen by someone who is not the intended customer. For this reason, the customer is required to activate the card when he receives it.

The payment card activation is typically performed in one of the following modes. For example, the payment card may be activated at a bank office after having received the payment card by the customer going to the bank office and requesting the payment card activation. This activation mode has several disadvantages in that is time consuming for the customer, both because of the time spent at the office and because the bank office is open only during specific times of the day.

Another mode of payment card activation includes activation through a call center. For example, after having received the payment card, the customer may call the bank call center, which verifies customer information (e.g., credentials and other sensitive data) and activates the payment card. This mode also may not be perceived as simple by every customer because it requires a fair amount of time, requires the customer to call at specific times of the day and also poses a possible security threat since it is necessary to provide sensitive data to the operator.

The payment card activation may also be completed through the Web. In particular, after the customer receives the payment card, the customer accesses a bank web page on a bank server and requests card activation. One disadvantage of this mode is that the bank may not be able to confirm that the payment card has been received by the intended customer thereby causing a security issue. Then, the customer has to login to the bank web site, which not all customers may find simple, in particular those customers not comfortable with computers. In addition, it is time consuming.

SUMMARY

An object of one or more embodiments is to provide a system and related methods for the activation of a payment card that solves the drawbacks of the prior art and in particular allows performing the activation in a secure, quick, simple manner, without the need of operating at a specific time of the day.

One or more embodiments may refer to a non-transitory computer-readable medium storing instructions that, when executed, cause a computing device to perform steps. As used herein, reference to such non-transitory computer-readable medium is understood as being a reference to a computer-readable medium containing instructions for controlling a computer processing system in order to coordinate implementation according to the embodiments. Reference to "at least one computer" is intended to highlight the possibility of the present embodiments being implemented in modular and/or distributed form.

According to the approaches described herein, the method includes storing a unique code corresponding to a given payment card both in a smart card corresponding to a cardholder, comprising a contactless readable interface, used as a payment card, and in the remote computer server. The method also includes reading the unique code by a user terminal configured to connect over a communication network to access messages, e.g., to receive SMS or access to e-mail messages, directed to the cardholder. The user terminal includes a corresponding contactless interface, in particular an NFC interface, and is configured to send the unique code from the user terminal to the remote computer server. Upon verification of the unique code at the remote computer server, the remote computer server is configured to generate and send an activation code to the user terminal and supply to the user terminal access an activation code input mask corresponding to the payment card. The method also includes upon submission of the activation code, comparing the submitted code with the generated code and, in case of matching, activating the payment card.

In various embodiments, the approaches described herein include that the remote computer server is associated to one or more database comprising association tables associating the unique code to the payment card.

In various embodiments, the storing of a unique code corresponding to a given payment card in a smart card that corresponds to a cardholder, includes storing the unique code combined with address information of the remote server to form a unique address on the remote computer server specific of the given payment card, in particular a unique URL (Universal Remote Locator).

In various embodiments, the approaches described herein include that the smart card may be a dual interface card and the contactless interfaces of the smart card and of the user terminal are NFC (Near Field Communication) interfaces.

In various embodiments, the approaches described herein include that the activation code input mask corresponding to the payment card may include making a Web page comprising the activation code input mask accessible at the unique URL.

In various embodiments, the approaches described herein include storing in the payment card, payment applications and an application which emulates an NFC Tag, where the URL is stored in the application which emulates an NFC Tag.

In various embodiments, the approaches described herein include activating the payment card setting an activation status into a payment card database.

In various embodiments, the approaches described herein include generating the activation code at the card issuer, in particular as a random number, preferably associated to an expiration time.

In various embodiments, the approaches described herein include sending an activation code to the user terminal by sending the activation code in a message to the user terminal, in particular a SMS (Short Message System) or an electronic mail message.

BRIEF DESCRIPTION OF THE DRAWINGS

Embodiments of the present disclosure will now be described with reference to the annexed drawings, which are provided purely by way of non-limiting example and in which:

FIG. 4 is a schematic diagram of a record of database used in association with the system and method to activate a payment card.

DETAILED DESCRIPTION

The ensuing description illustrates various specific details aimed at an in-depth understanding of the embodiments. The embodiments may be implemented without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is meant to indicate that a particular configuration, structure, or characteristic described in relation to the embodiment is comprised in at least one embodiment. Likewise, phrases such as "in an embodiment" or "in one embodiment", that may be present in various points of the present description, do not necessarily refer to the one and the same embodiment. Furthermore, particular conformations, structures, or characteristics can be combined appropriately in one or more embodiments.

The references used herein are intended merely for convenience and hence do not define the sphere of protection or the scope of the embodiments.

Figure 1:
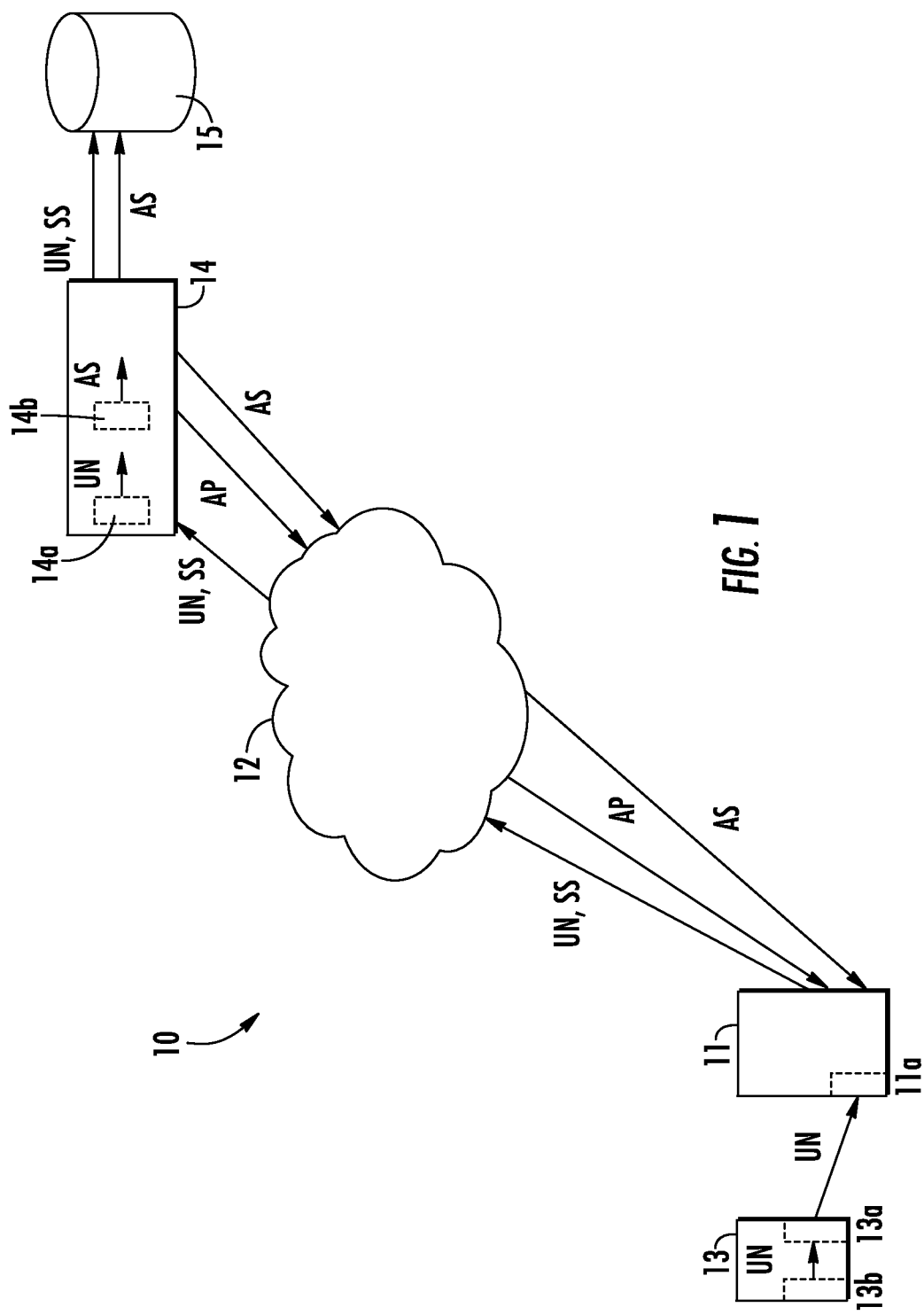
FIG. 1 is a block diagram representing a system for activating a payment card.

In FIG. 1, a block diagram representing a system for payment card activation is shown. The system, indicated as a whole with the reference 10, includes a user terminal 11, such as a smart phone, i.e. a communication apparatus, in particular a wireless communication apparatus, such as a mobile phone, connected to a communication network, having computer capabilities, such as a storage memory and an operative system, and including the capability of loading, storing and executing a software application. The user terminal 11 therefore has the capability of communicating via a telecommunication network 12, with other computers. In particular, in the example, the telecommunication network 12 corresponds to the World Wide Web network, which the user terminal 11 can access either directly via mobile network, such as 4G or GSM, or via other means, such as Wi-Fi connection. The user terminal 11 also includes a NFC (Near Field Communication) interface 11a, allowing it to communicate with NFC enabled devices, such as a payment card 13. The payment card 13 is a dual-interface smartcard, implementing both contactless and contact interfaces on a single card with some shared storage and processing. In FIG. 1 the contactless interface 13a is shown, which includes an antenna and circuitry capable of communicating at the NTC RF frequency of 13.56 MHz. The payment card 13 contains applications in its storage portion such as payment applications and, in addition, it is provided with a NDEF TAG application which emulates a NFC Tag 13b. Accordingly, an NFC capable device such as the user terminal 11 can read the content of the NFC Tag 13b by tapping the user terminal 11 device on the payment card 13.

In FIG. 1, a bank server 14 is shown, i.e. a computer server which can be remotely accessed by the terminal 11 through the World Wide Web communication network 12. Such bank server 14 is connected for exchanging information with a payment card data base 15, which contains data pertaining to the payment card 13 issued by the bank controlling the bank server 14. In the following description, the bank server 14 will be used to also represent the bank operations as a whole if they are carried out through other computers and devices controlled by the bank.

Figure 2:
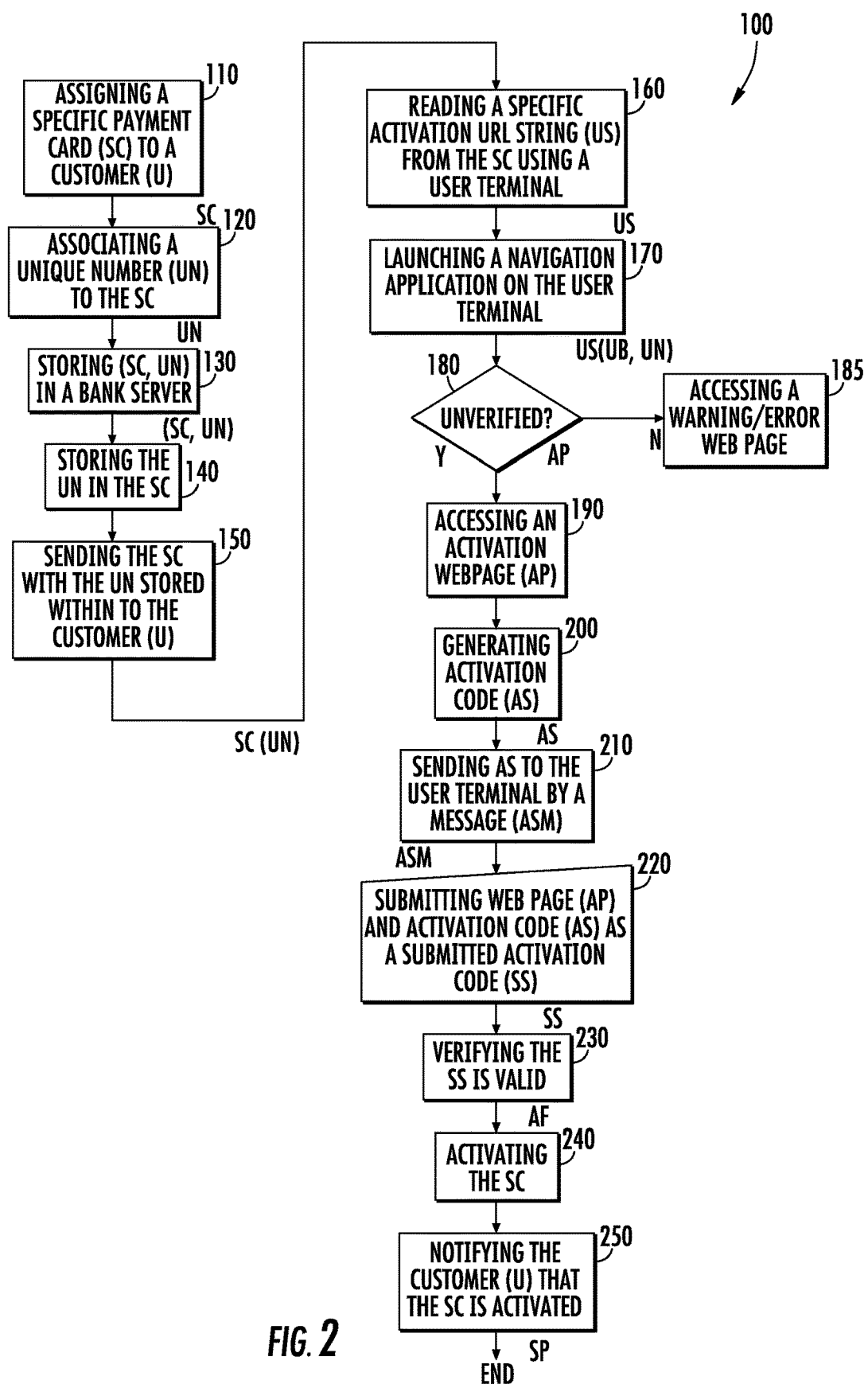
FIG. 2 is a flow diagram of a method for activating a payment card.

In FIG. 2, a flow diagram represents a method for the activation of a payment card, indicated as whole by the number reference 100.

At step 110, a specific payment card SC, i.e. a payment card 13, which is assigned to a given user, is issued to a customer or cardholder, U. The payment card SC, which can be identified through its card number, can be issued because it is a first payment card for that user U, or because it a new payment card replacing an expired card or a lost card or a stolen card.

At step 120, a unique number UN is generated at the bank, associated to the card, by way of example 2A8E23C7D64923768720 34DEF62A12FF. The unique number N is generated by a unique number generator 14a, which in FIG. 1 is shown included in the server 14. The unique number generator 14a is a software module that generates unique numbers, in particular starting from a progressive number. The unique number UN is generated starting from a progressive number. Each generated unique number UN is uniquely associated to the specific payment card SC. Each card SC sent by the bank has its own unique number UN.

Then, at step 130 the bank server 14 stores an association table (database) between unique numbers UN and physical specific payment cards SC, i.e. containing pairs (SC, UN). In other words, the payment card data base 15 contains a data base record R for each payment card SC and the record R contains at least one field for storing the unique number UN corresponding to that payment card SC. To the person skilled in the art it is in any case that there are other ways in a data structure to associate information pertaining the card SC and an identification code such as the unique number UN.

In FIG. 4 an example of a record R of the payment card data base 15 is shown, which includes a field identifying the payment card SC. For example, through the card number, this field being the index field of the record (otherwise the record R can simply have an independent identification number as in most databases), the record R also including a field for the unique number UN. The record R shown in FIG. 4 also includes other fields which will be better illustrated in the following description.

Then, at step 140 the unique number UN is stored in the payment card SC, in particular in a memory of the smart card, as data accessible for use to the NDEF TAG application. In particular, the unique number UN is stored in an activation URL US which combines a bank server URL UB (e.g. www.bankname.com/activation/) UB and the unique number UN.

Then, at step 150, the payment card SC with the unique number UN stored within, i.e. a card SC(UN), is sent to the customer U.

After having received the payment card SC, the customer U, at step 160 taps the card on the user terminal 11, i.e. the NFC enabled smartphone, to read the content of the NDEF Tag 13b. The NDEF TAG application associated with the NDEF Tag 13b is customized with a specific activation URL (Uniform Resource Locator) string US. Thus, the payment card 13 may be a dual-interface multi-application payment card containing at least a payment application and a NDEF TAG application. The NDEF TAG Application can be programmed with a URL US and can be locked so that the written URL US cannot be modified.

The user terminal 11, after the tapping step 160, launches at step 170 a navigation application, such as an Internet browser, with the activation URL US read from the payment card SC. Such activation URL US, stored at step 140 as data variables handled by the NDEF TAG application combines a bank server URL UB (e.g. www.bankname.com/activation/) UB and the unique number UN associated to the payment card SC. The resulting URL, as an example, could be: www.bankname.com/activation/ 2A8E23C7D6492376872034DEF62A12FF, i.e. UB/UN.

The bank server 14 at step 180 verifies the unique number UN, in particular checking if the unique number exists and if it is associated to a payment card SC never activated before. This can be done in the payment card data base 15, which in an embodiment can include in the same record R, as shown in FIG. 4 other information pertaining to a given payment card SC, besides the unique number UN, for instance the card's activation status AF and history AH, i.e. if it is a card which awaits the first activation or not. In other embodiments, these activation data, status AF and history AH, can be contained in separated databases or association tables which can be accessed by the bank server 14.

If the unique number UN is not positively verified, the bank remote server 14 gives access to a warning/error web page 185.

Figure 3:
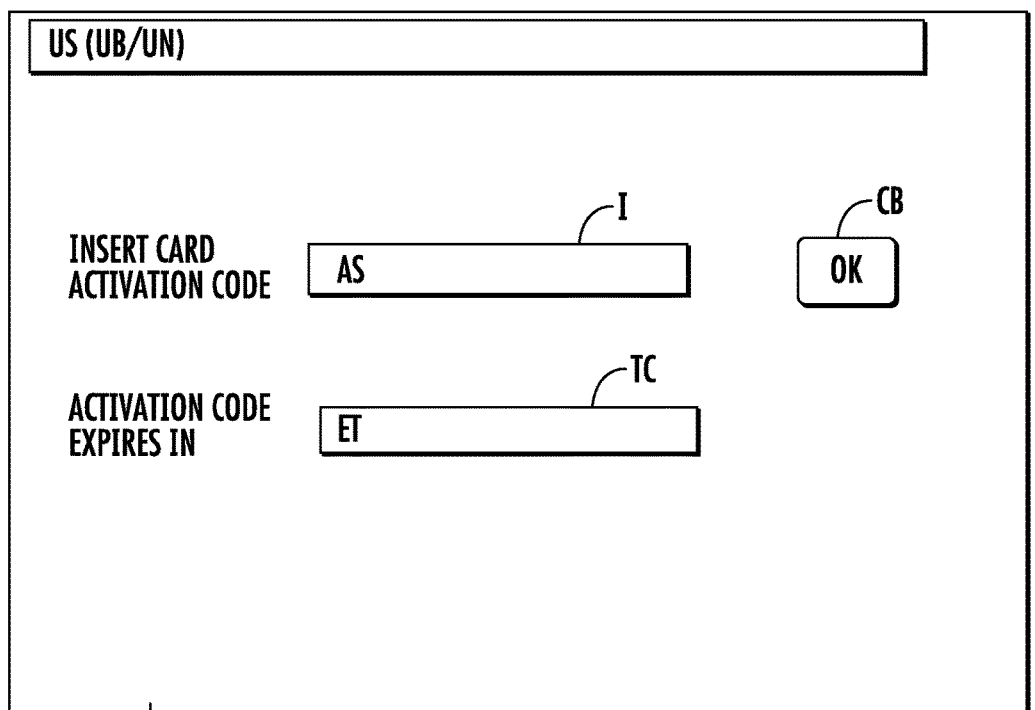
FIG. 3 is a schematic diagram of a Web page generated by an embodiment of the system and method to activate a payment card.

If the unique number UN is positively verified, the bank server 14 will let the user terminal 11, at step 190, access an activation page AP, as shown in FIG. 3, corresponding to the activation URL US.

Such page contains at least an input mask I, i.e. an activation field to be filled by the customer U through the user terminal 11, to submit an activation code AS to the bank server 14. Preferably the activation page AP also contains a time field TC which shows an expiration time ET (e.g. 3 minutes). The field can be in the form of a backward counter updated according to a given time interval, i.e. 3 or 10 minutes. A new activation code by way of a new tap shall be requested after that time expiration.

Then, or substantially in the same time, as shown in FIG. 2, the bank server 14, at step 200, generates the activation code AS which is a random number, preferably with few digits (e.g. 4 digits: 3452) that has an expiration time ET: it is no more usable after a predefined time from its generation and shipment to the customer. An activation code generation module 14b, i.e. a software module, like module 14a, comprised in the server 14 is preferably used. The activation code AS may be a random number of few digits.

During such step 200 the activation code AS is preferably stored in the record R of the corresponding payment card SC as shown in FIG. 4.

In various embodiments, since the activation code AS is dynamically generated and expires, it could also not be stored in such record R. In general, all the activation attempts could be logged by the server 14 with their details, including the required activation code AS and the submitted activation code SS, but this information could preferably not be part of the database section. However, if the activation code AS is not part of the profile and is dynamic, it can be stored there taking into account that it is meant to expire, while the other information in the record is not.

After the activation code AS generation 200, the bank server 14, at step 210, sends the activation code AS to the user terminal 11 by a message ASM (e.g., SMS, email, WhatsApp, etc). A phone number PH and/or an email address EM or other address suitable to send the message ASM to the cardholder U through the user terminal 11, i.e. so that either the user terminal 11 can receive directly the message ASM (e.g., SMS) or access a message repository of the cardholder (e.g., e-mail), are available, for instance in the database 15, or in another database accessible to the bank server 14, as part of customer information stored by the bank, which is or can be associated to the specific card SC. In FIG. 4, the phone number PH and e-mail address EM are fields of the record R of the payment card SC.

At step 220, the customer receives the message ASM with the activation code AS and fills the activation field I with it, submitting the page AP (for instance through the confirmation button CB shown in FIG. 3) and the code, as submitted activation code SS, before reaching the expiration time ET.

The bank server 14, at step 230, checks that the submitted activation code SS is valid. Preferably the submitted activation code SS is compared to the activation code AS stored in the database 15 in the corresponding field AS shown in FIG. 4, for the corresponding payment card SC.

If the submitted activation code SS is correct, the bank server 14 activates, at step 240, the payment card into the payment card database 15, for instance by turning to active the corresponding activation status field AF (and a corresponding variable which is then read in the future card transactions) in the record of the payment card SC. Activation 240 of course also provides the steps which may be necessary to activate the card in the whole payment circuit.

The bank server 14 finally, at step 250, notifies the customer U through the navigation application, giving access to a web page SP containing a text message indicating the success of the operation.

Thus, with reference to the embodiment just described with reference to the example of FIG. 2, the method in general at least includes performing the activation of a payment card SC comprising accessing a remote computer server 14 of a card issuer, such as the bank, to input card activation information, such as the activation code AS. The method providing at least a step 120 of storing a unique code UN corresponding to a given payment card SC, storing it both in a smart card 13 corresponding to a cardholder U, that comprises a contactless readable interface 13a, in particular a NFC interface, used as payment card SC, and in the remote computer server 14. In addition, the method includes at step 140, of reading 160 the unique code UN by a user terminal 11, in particular a smart-phone or another type of computer with remote communication capabilities, in particular over the World Wide Web, associated to the cardholder U and comprising a corresponding contactless interface 11a, in particular a NFC interface. The method may also include, at step 170, sending the unique code UN from the user terminal 11 to the remote computer server 14, upon a verification step 180 of the unique code UN at the remote computer server 14, performing a step 200 of generating and a step 210 of sending the activation code AS to the user terminal 11 associated to the cardholder U. The method may include performing, at step 190, supplying to the user terminal access to an activation code input mask, i.e. the activation page AP, shown in FIG. 3, corresponding to the activation URL US, corresponding to the payment card SC, upon a step of submission 220 of the activation code SS, in particular through the activation page AP, performing a step 230 of comparing 230 the submitted code SS with the activation code AS generated at the server 14 and, in case of matching between the submitted code SS and the activation code AS, activating 240 the payment card SC.

The method according to the various embodiments here described is advantageously secure since only the payment card contains the unique number necessary to ask the activation code and so, only after the payment card reception by the user, the unique number can be known. Also, the method herein described is further secure since the activation code is sent to the cardholder, i.e. the user which contacting data, e.g., phone number or e-mail, are stored, and not simply to a subject which is using the card. Also, the method herein described is further secure since no communication of sensitive data is involved for the activation.

The method herein described reduces time and effort because it requires the cardholder to only perform an NFC tap operation and a field filling operation, without time frame constraints and time wasting.

Of course, without prejudice to the principle of the embodiments, the details of construction and the embodiments may vary widely with respect to what has been described and illustrated herein purely by way of example, without thereby departing from the scope of the present embodiments, as defined the ensuing claims.

The invention claimed is:

1. A method for activation of a payment card comprising:
using a user terminal to access a remote computer server associated with a card issuer to input card activation information, wherein a unique code and a remote computer server Universal Resource Locator (URL) are stored in the remote computer server and in the payment card, wherein the payment card comprises a contactless readable interface, wherein the user terminal is configured to read the unique code of the payment card and the remote computer server URL, and wherein the user terminal comprises a corresponding contactless interface;
launching a navigation application on the user terminal to access an URL comprising the unique code on the remote computer server over a communications network after the user terminal reads the unique code and the remote computer server URL stored in the payment card via the contactless readable interface of the payment card;
in real-time after the launching, after the unique code received from the user terminal is found to exist in a database at the remote computer server and after the unique code is found to be associated to the payment card that has not been activated, receiving a message with an activation code having an expiration time of the activation code at the user terminal from the remote computer server;
receiving an access to an activation code input mask to input the activation code from the remote computer server; and
submitting the activation code through the activation code input mask using the user terminal, the payment card configured to be activated when a comparison of the submitted activation code with a generated activation code is a match, the activation code being received at the remote computer server within the expiration time of the activation code.

2. The method according to claim 1, wherein the remote computer server being associated with one or more databases having tables associating the unique code to the payment card.

3. The method according to claim 1, wherein the URL, of the remote computer server comprises a unique address on the remote computer server specific to the payment card.

4. The method according to claim 1, wherein the payment card being a dual interface card and the contactless interfaces of the payment card and of the user terminal being NFC (Near Field Communication) interfaces.

5. The method according to claim 3, wherein the activation code input mask comprises making the activation code input mask accessible at a Web page at the unique address.

6. The method according to claim 3, wherein the payment card comprises payment applications and an application which e dates an NFC Tag, the unique address being stored in the application which emulates an NFC Tag.

7. The method according to claim 1, wherein the activating of the payment card comprises setting an activation status into a payment card database.

8. The method according to claim 1, wherein the activation code is a random number associated to the expiration time.

9. The method according to claim 1, wherein the message is accessible to the user terminal as an SMS (Short Message System) or an electronic mail message.

10. The method according to claim 1, wherein the user terminal reads the unique code and the remote computer server URL from the payment card through the corresponding contactless interface of the user terminal.

11. The method according to claim 1, wherein the URL comprises the unique code and the remote computer server URL stored in the payment card and read by the user terminal.

12. The method according to claim 1, wherein the receiving the message with the activation code comprises receiving the message after the user terminal reads the unique code of the payment card and the remote computer server URL from the payment card.

13. A user terminal for activation of a payment card comprising:
a contactless interface;
a memory; and
at least one processor coupled to the memory and configured to:
access a remote computer server associated with a card issuer to input card activation information, wherein a unique code and a remote computer server Universal Resource Locator (URL) are stored in the remote computer server and in the payment card, wherein the payment card comprises a contactless readable interface corresponding to the contactless interface of the user terminal, wherein the user terminal is configured to read the unique code of the payment card and the remote computer server URL;
launch a navigation application on the user terminal to access an URL comprising the unique code on the remote computer server over a communications network after the user terminal reads the unique code and the remote computer server URL stored in the payment card via the contactless readable interface of the payment card;

in real-time after launching the navigation application, after the unique code received from the user terminal is found to exist in a database at the remote computer server and after the unique code is found to be associated to the payment card that has not been activated, receive a message with an activation code having an expiration time of the activation code at the user terminal from the remote computer server;

receive an access to an activation code input mask to input the activation code from the remote computer server; and submit the activation code through the activation code input mask using the user terminal, the payment card configured to be activated when a comparison of the submitted activation code with a generated activation code is a match, the activation code being received at the remote computer server within the expiration time of the activation code.

14. The user terminal according to claim 13, wherein the remote computer server being associated with one or more databases having tables associating the unique code to the payment card.

15. The user terminal according to claim 13, wherein the URL of the remote computer server comprises a unique address on the remote computer server specific to the payment card.

16. The user terminal according to claim 13, wherein the payment card being a dual interface card and the contactless interfaces of the payment card and of the user terminal being NFC (Near Field Communication) interfaces.

17. The user terminal according to claim 15, wherein the activation code input mask comprises making the activation code input mask accessible at a Web page at the unique address.

18. The user terminal according to claim 15, wherein the payment card comprises payment applications and an application which emulates an NFC Tag, the unique address being stored in the application which emulates an NFC Tag.

19. The user terminal according to claim 13, wherein the activating of the payment card comprises setting an activation status into a payment card database.

20. The user terminal according to claim 13, wherein the activation code is a random number associated to the expiration time.

21. The user terminal according to claim 13, wherein the message is accessible to the user terminal as an SMS (Short Message System) or an electronic mail message.

22. The user terminal according to claim 13, wherein the user terminal reads the unique code and the remote computer server URL from the payment card through the corresponding contactless interface of the user terminal.

23. The user terminal according to claim 13, wherein the URL comprises the unique code and the remote computer server URL stored in the payment card and read by the user terminal.

24. The user terminal according to claim 13, wherein receiving the message with the activation code comprises receiving the message after the user terminal reads the unique code of the payment card and the remote computer server URL from the payment card.

25. A computer-readable storage medium having instructions stored thereon that, when executed by a user terminal, cause the user terminal to perform operations for activation of a payment card, the operations comprising:

using a user terminal to access a remote computer server associated with a card issuer to input card activation information, wherein a unique code and a remote computer server Universal Resource Locator (URL) are stored in the remote computer server and in the payment card, wherein the payment card comprises a contactless readable interface, wherein the user terminal is configured to read the unique code of the payment card and the remote computer server URL, and wherein the user terminal comprises a corresponding contactless interface;

launching a navigation application on the user terminal to access an URL comprising the unique code on the remote computer server over a communications network after the user terminal reads the unique code and the remote computer server URL stored in the payment card via the contactless readable interface of the payment card;

in real-time after the launching, after the unique code received from the user terminal found to exist in a database at the remote computer server and after the unique code is found to be associated to the payment card that has not been activated, receiving a message with an activation code having an expiration time of the activation code at the user terminal from the remote computer server;

receiving an access to an activation code input mask to input the activation code from the remote computer server; and submitting the activation code through the activation code input mask using the user terminal, the payment card configured to be activated when a comparison of the submitted activation code with a generated activation code is a match, the activation code being received at the remote computer server within the expiration time of the activation code.

26. The computer-readable storage medium according to claim 25, wherein the remote computer server being associated with one or more databases having tables associating the unique code to the payment card.

27. The computer-readable storage medium according to claim 25, wherein the URL of the remote computer server comprises a unique address on the remote computer server specific to the payment card.

28. The computer-readable storage medium according to claim 27, wherein the activation code input mask comprises making the activation code input mask accessible at a Web page at the unique address.

29. The computer-readable storage medium according to claim 27, wherein the payment card comprises payment applications and an application which emulates an NFC Tag, the unique address being stored in the application which emulates an NFC Tag.

30. The computer-readable storage medium according to claim 25, wherein the payment card being a dual interface card and the contactless interfaces of the payment card and of the user terminal being NFC (Near Field Communication) interfaces.

31. The computer-readable storage medium according to claim 25, wherein the activating of the payment card comprises setting an activation status into a payment card database.

* * * * *

UNITED STATES PATENT AND TRADEMARK OFFICE
CERTIFICATE OF CORRECTION

PATENT NO. : 10,074,231 B2
APPLICATION NO. : 14/971232
DATED : September 11, 2018
INVENTOR(S) : Rita Miranda Page 1 of 1

It is certified that error appears in the above-identified patent and that said Letters Patent is hereby corrected as shown below:

In the Claims

In Column 8, Line 21, Claim 6, delete "e dates" and insert --emulates--.

Signed and Sealed this
Thirtieth Day of October, 2018

Andrei Iancu
*Director of the United States Patent and Trademark Office*